Jan. 19, 1926.

A. B. FELDMAR

PLUG OR SOCKET FOR MASONRY

Filed Jan. 23, 1925

1,570,234

Patented Jan. 19, 1926.

1,570,234

UNITED STATES PATENT OFFICE.

ADALBERT BELA FELDMAR, OF BERLIN-SCHONEBERG, GERMANY.

PLUG OR SOCKET FOR MASONRY.

Application filed January 23, 1925. Serial No. 4,336.

*To all whom it may concern:*

Be it known that I, ADALBERT BELA FELDMAR, a citizen of Hungary, and residing at Berlin-Schoneberg, in the Province of Brandenburg, Germany, have invented certain new and useful Improvements in or Relating to Plugs or Sockets for Masonry, of which the following is a specification.

The present invention relates to a plug or socket for securing screws, nails, hooks or the like in stone, glass, metal and other similar materials.

The hitherto known types of plugs merely fulfil their purpose in an incomplete manner. Thus, for example, if metal plugs are employed, the screw or the like is certainly seated quite firmly in the plug, but the latter is not securely held in the wall or other point of attachment, unless special means are provided which, due to the resulting expense in manufacture, are not capable of practical employment.

If the plug is composed of a fibrous material, same usually obtains a firm hold in the wall or the like, but the screw or other pointed article used is not situated firmly in the plug, the fibrous material tending to give upon certain strains, for example a tensile strain. It is shown particularly in the case of securing a screw that after the latter has been removed from and again screwed into the plug on several occasions, the fibrous material has to a certain extent been destroyed, and the screw is consequently unable to obtain a further hold.

The object of the present invention is to remedy these said defects.

The plug according to the invention consists in the combination of two sleeves, one situated within the other, the inner sleeve being firm in structure and composed of soft metal, fibre, or other soft and expansible material, and the outer sleeve composed of a resilient, fibrous material and loose in structure, for example, plaited. A plug constructed in such manner is capable of holding screws, nails, hooks and the like with invariable firmness, allows same to be repeatedly withdrawn from and reinserted into the plug, and is itself absolutely securely seated in the wallwork or other point of attachment.

If, for example, it is desired to secure a screw in a wall composed of wood, stone, metal, glass or the like, the plug is inserted into the previously prepared boring in the wall, and the screw is screwed into the inner sleeve, in which is thus automatically formed a well cut thread. The inner sleeve, the aperture of which is somewhat smaller than the shaft of the screw, is expanded outwardly, particularly at the point where acted upon by the thread of the screw. In this manner the inner sleeve is firmly pressed against the encompassing outer sleeve of loose fibrous material. This outer, fibrous sleeve, which may be formed of loosely disposed or plaited strips, yields along its whole area, and the mass thereof is distributed in such manner that same is firmly pressed with the whole of its outer area against the sides of the boring in the wall.

A form of embodiment of the invention for the attachment of a screw is shown by way of example in the accompanying drawing.

Figure 1:
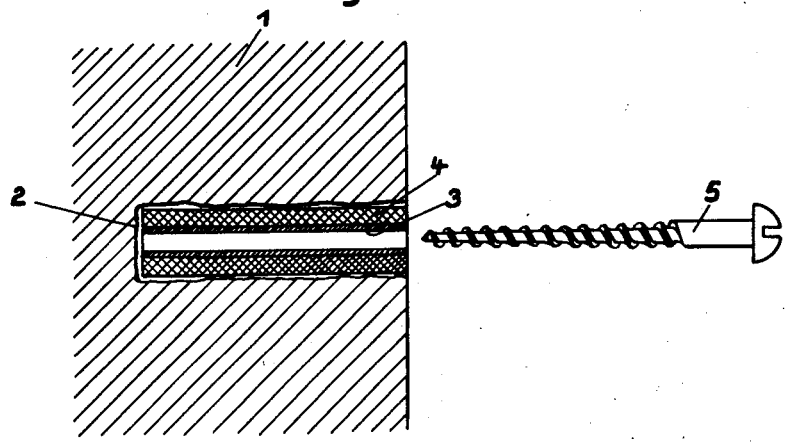
Fig. 1 shows in part section the plug in position in the wall before the insertion of the screw.
Figure 2:
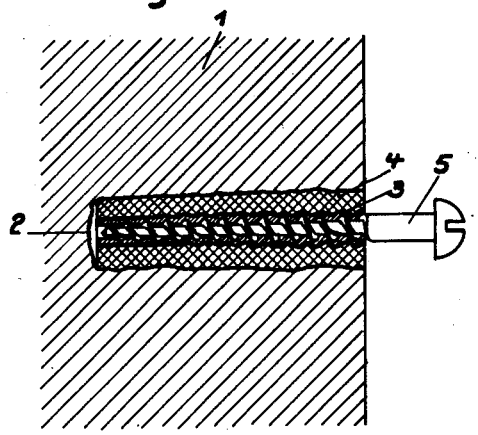
Fig. 2 is a corresponding view of the plug after insertion of the screw.

A boring 2 is formed in the wall 1 in the usual manner. Into this boring is inserted the plug. The plug consists of an inner sleeve 3 and an outer sleeve 4. The inner sleeve 3 is of firm structure, and is composed of soft metal, fibre, or another soft, impressible and expansible material. The wall thereof is only of such thickness that upon the insertion of the screw 5 a thread is capable of being formed therein without danger of breaking, at the same time the whole sleeve being correspondingly expanded, particularly at the points where acted upon by the thread of the screw. The expansion and outer displacement of the sleeve material causes a firm connection between the inner and outer sleeves. The outer sleeve 4 is loose in structure; same is capable of expansion, or even of splitting. This outer sleeve is composed of fibrous material, for example plaited fibres, or fibres disposed side by side in the longitudinal direction and held together by means of a suitable binding agent. The expansion of the inner sleeve 3 also causes the expansion of the encompassing fibrous sleeve 4, the latter yielding at all points. The fibrous material is distributed over all points in accordance with any unevenness disclosed in the wall of the boring, is compressed or expanded, and is pressed firmly against the wall of said boring.

The screw 5 may be removed from and again inserted into this plug as often as desired. The fixed thread in the inner sleeve is in no way damaged by doing so, and the firmness of the whole plug in the boring of the wall is no manner affected.

What I claim is:

1. A plug, comprising, an outer sleeve, an inner sleeve received in the outer sleeve, the outer sleeve being composed of a resilient expansible fibrous material, the inner sleeve being continuous throughout and composed of a firm, impressible material.

2. A plug, comprising, an outer sleeve, an inner sleeve received in the outer sleeve, the outer sleeve being composed of a resilient expansible fibrous material, the inner sleeve being continuous throughout and composed of a firm, impressible metal.

3. A plug, comprising, an outer sleeve, an inner sleeve received in the outer sleeve, the outer sleeve being composed of a resilient expansible fibrous material, the inner sleeve being continuous throughout and composed of lead.

4. A plug, comprising, an outer sleeve, an inner sleeve received in the outer sleeve, the outer sleeve being composed of a resilient expansible fibrous material, the inner sleeve being continuous throughout and composed of a firm, impressible metal, and having a smooth cylindrical inner surface.

5. A plug, comprising, an outer sleeve, an inner sleeve received in the outer sleeve, the outer sleeve being composed of a resilient expansible fibrous material, the inner sleeve being continuous throughout and composed of lead, and having a smooth cylindrical inner surface.

6. A plug comprising, an outer sleeve formed of resilient expansible plaited fibers, and an inner sleeve received in the outer sleeve, the inner sleeve being composed of lead, being continuous throughout, and having a smooth cylindrical inner surface.

In testimony whereof I have affixed my signature.

ADALBERT BELA FELDMAR.